United States Patent
Truong et al.

(10) Patent No.: US 11,776,520 B2
(45) Date of Patent: Oct. 3, 2023

(54) HYBRID NOISE SUPPRESSION FOR COMMUNICATION SYSTEMS

(71) Applicant: Plantronics, Inc., Santa Cruz, CA (US)

(72) Inventors: Kwan Kin Truong, Johns Creek, GA (US); Jacob T. Meyberg Guzman, Santa Cruz, CA (US); Peter L. Chu, Lexington, MA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 17/942,243

(22) Filed: Sep. 12, 2022

(65) Prior Publication Data

US 2023/0015161 A1 Jan. 19, 2023

Related U.S. Application Data

(62) Division of application No. 17/175,350, filed on Feb. 12, 2021, now Pat. No. 11,475,869.

(51) Int. Cl.
*G10K 11/00* (2006.01)
*G06N 3/02* (2006.01)

(52) U.S. Cl.
CPC .............. *G10K 11/002* (2013.01); *G06N 3/02* (2013.01)

(58) Field of Classification Search
None
See application file for complete search history.

(56) References Cited

U.S. PATENT DOCUMENTS

| | | |
|---|---|---|
| 5,544,250 A | 8/1996 | Urbanski |
| 6,097,820 A | 8/2000 | Turner |
| 8,983,844 B1 * | 3/2015 | Thomas .......... G10L 15/30 704/226 |
| 9,099,093 B2 | 8/2015 | Choi et al. |
| 10,602,270 B1 | 3/2020 | Sørensen et al. |
| 11,146,607 B1 | 10/2021 | Tang et al. |
| 11,158,335 B1 | 10/2021 | Ganguly et al. |
| 11,521,635 B1 * | 12/2022 | Chhetri .......... G06N 3/04 |

(Continued)

FOREIGN PATENT DOCUMENTS

| | | |
|---|---|---|
| EP | 2151822 A1 | 2/2010 |
| EP | 2226795 A1 | 9/2010 |
| WO | 2009/096958 A1 | 8/2009 |

OTHER PUBLICATIONS

International Search Report issued in related International Application No. PCT/US2020/054612 dated Jan. 22, 2021, 4 pages.

(Continued)

*Primary Examiner* — Kenny H Truong
(74) *Attorney, Agent, or Firm* — QUARLES & BRADY LLP

(57) ABSTRACT

A method for hybrid noise suppression includes receiving a processed audio signal from an audio device. The processed audio signal results from a partial audio processing performed on a noisy audio input signal. The method further includes predicting a noise suppression parameter using a neural network model operating on the processed audio signal and generating a noise-suppressed audio signal from the processed audio signal, using the noise suppression parameter. The method further includes generating a noise-suppressed audio output signal from the noise-suppressed audio signal using an additional audio processing and outputting the noise-suppressed audio output signal.

18 Claims, 7 Drawing Sheets

(56) References Cited

U.S. PATENT DOCUMENTS

| | | |
|---|---|---|
| 11,523,244 B1* | 12/2022 | Meade ................. G10K 15/08 |
| 2010/0226515 A1 | 9/2010 | Fischer |
| 2018/0190280 A1 | 7/2018 | Cui et al. |
| 2019/0066654 A1 | 2/2019 | Dickins et al. |
| 2020/0111503 A1 | 4/2020 | Huang et al. |
| 2020/0312343 A1 | 10/2020 | Wei |
| 2020/0382859 A1 | 12/2020 | Woodruff et al. |
| 2020/0388297 A1 | 12/2020 | Rudberg et al. |
| 2021/0110840 A1 | 4/2021 | Chu et al. |
| 2022/0044696 A1* | 2/2022 | Kim ...................... G06N 3/045 |

OTHER PUBLICATIONS

Mirsamadi, S. et al., "Causal Speech Enhancement Combining Data-Driven Learning and Suppression Rule Estimation"; Interspeech 2016, Sep. 12, 2016, pp. 2870-2874.

Written Opinion of the International Searching Authority issued in related International Application No. PCT/US2020/054612 dated Jan. 22, 2021, 9 pages.

Yan-Hui, T. et al., "A Hybrid Approach to Combining Conventional and Deep Learning Techniques for Single Channel Speech Enhancement and Recognition", 2018 International Conference on Acoustics, Speech and Signal Processing (ICASSP), IEEE, Apr. 15, 2018, 5 pages.

\* cited by examiner

US 11,776,520 B2

HYBRID NOISE SUPPRESSION FOR COMMUNICATION SYSTEMS

CROSS REFERENCE TO RELATED APPLICATIONS

This application is a divisional application of, and thereby claims benefit under 35 U.S.C. § 121 to, U.S. patent Ser. No. 17/175,350 filed on Feb. 12, 2021. U.S. patent Ser. No. 17/175,350 is incorporated herein by reference in entirety.

FIELD

The present disclosure relates generally to the field of acoustic signal processing. More particularly, the present disclosure relates to acoustic signal processing in teleconferencing devices.

BACKGROUND

An acoustic signal may include a signal of interest, for example speech, but the acoustic signal may also include noise. A noise suppression may be performed to attenuate the noise in the acoustic signal. The noise may include various components, such as stationary and non-stationary components. Different techniques may be used to perform a noise suppression. The different techniques may suppress the various noise components to different degrees.

SUMMARY

In general, in one aspect, one or more embodiments relate to a method for hybrid noise suppression that includes receiving a processed audio signal from an audio device. The processed audio signal results from a partial audio processing performed on a noisy audio input signal. The method further includes predicting a noise suppression parameter using a neural network model operating on the processed audio signal and generating a noise-suppressed audio signal from the processed audio signal, using the noise suppression parameter. The method further includes generating a noise-suppressed audio output signal from the noise-suppressed audio signal using an additional audio processing and outputting the noise-suppressed audio output signal.

In general, in one aspect, one or more embodiments relate to a system for hybrid noise suppression, comprising a host device, memory; and circuitry for performing operations using the memory. The operations include receiving a processed audio signal from an audio device. The processed audio signal results from a partial audio processing performed on a noisy audio input signal. The operations further include predicting a noise suppression parameter using a neural network model operating on the processed audio signal and generating a noise-suppressed audio signal from the processed audio signal, using the noise suppression parameter. The operations further include generating a noise-suppressed audio output signal from the noise-suppressed audio signal using an additional audio processing and outputting the noise-suppressed audio output signal.

In general, in one aspect, one or more embodiments relate to a system for hybrid noise suppression, comprising an audio device and a host. The audio device is for performing partial audio processing on a noisy audio input signal and outputting the processed audio signal results. The host is for receiving a processed audio signal from the audio device. The operations further include predicting a noise suppression parameter using a neural network model operating on the processed audio signal and generating a noise-suppressed audio signal from the processed audio signal, using the noise suppression parameter. The operations further include generating a noise-suppressed audio output signal from the noise-suppressed audio signal using an additional audio processing and outputting the noise-suppressed audio output signal.

Other aspects of the invention will be apparent from the following description and the appended claims.

DETAILED DESCRIPTION

Figure 1:
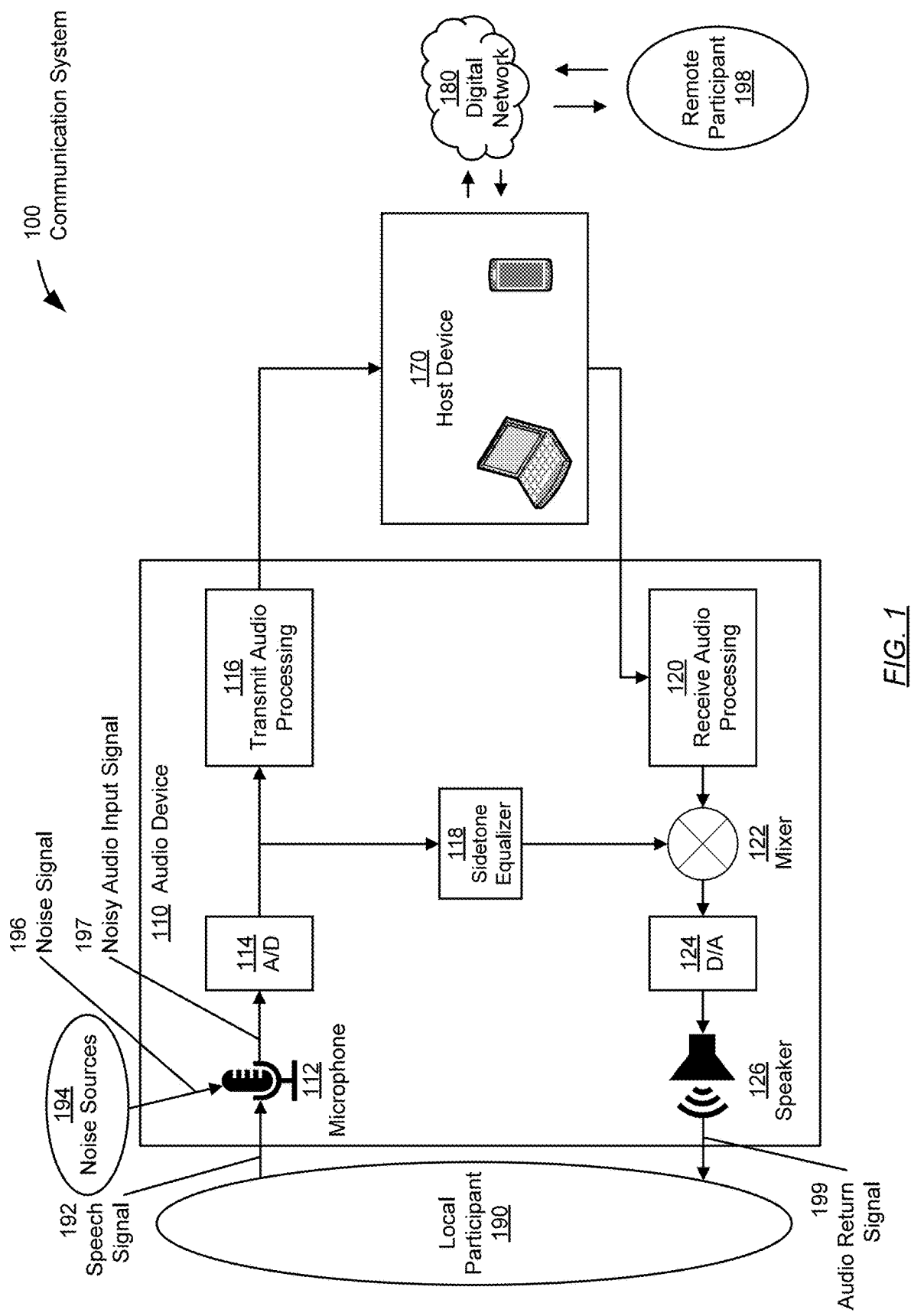
FIG. 1 shows a communication system, in accordance with one or more embodiments of the disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

Embodiments of the disclosure enable a processing of acoustic signals to reduce noise in the acoustic signals. In one or more embodiments, an acoustic signal includes speech and other acoustic content. The speech may be the signal of interest, whereas the other acoustic content may be considered noise. The noise may include various components, such as stationary and non-stationary components. An example for a stationary component is the continuous noise produced by a ventilation system. An example for a non-stationary component is a noise burst, e.g., as it may occur when a door is closed, when an object is dropped, etc. While the noise, stationary or non-stationary, may have very different characteristics, the common aspect is that the noise potentially degrades the signal of interest, e.g., making it harder to understand speech in a conference call.

One or more embodiments of the disclosure accept a noisy audio input signal and perform a hybrid noise suppression on the noisy audio input signal to generate a noise-suppressed audio output signal. The hybrid noise suppression, in one or more embodiments, involves a combination of a noise spectrum estimate-based noise suppression and a machine learning-based noise suppression. The combination of the two noise suppression approaches may provide a better noise suppression than the approaches performed individually. In addition, other audio processing operations may be performed on the noisy audio input signal. A detailed description of the hybrid noise suppression, the other audio processing operations, the noisy audio input signal, and the noise-suppressed audio output signal is subsequently provided.

In one or more embodiments, the machine learning based noise suppression operates on a comprehensively processed audio signal resulting from performing a comprehensive processing (including a noise spectrum estimate-based noise suppression and other operations, and further defined below) on the noisy audio input signal.

However, the parameters used by the machine learning-based noise suppression are obtained by operating on a partially processed audio signal that did not undergo the noise spectrum estimate-based noise suppression (and potentially other operations). The use of the partially processed audio signal for the purpose of obtaining the parameters ensures that the audio signal used for obtaining the parameters is comparable to audio recordings that may have been used for training the machine learning based noise suppression algorithm. The comprehensively processed audio signal may be less suitable for obtaining parameters because the more extensive processing of the comprehensively processed audio signal may result in distortions that, while providing a good human listening experience, may result in undesirable differences to the audio recordings used for training (which may be unprocessed or lightly processed) the machine learning.

The approach of computing the parameters using the partially processed audio signal while having the machine learning-based noise suppression algorithm operate on the comprehensively processed audio signal, in accordance with one or more embodiments, thus results in a superior performance, in comparison to the use of the comprehensively processed audio signal for obtaining the parameters.

Turning to FIG. 1, a communication system (100) in accordance with one or more embodiments is shown. The communication system (100) may enable a communication between a local participant (190) and a remote participant (198). Alternatively, the communication system (100) may be configured to record the local participant, or to perform as another type of audio input device. In one or more embodiments, the communication system (100) includes an audio device (110), a host device (170). The host device (170) may interface with a digital network (180), through which a connection to the remote participant (198) is achieved.

The audio device (110) may be, for example, a telecommunication headset or any other kind of device that captures audio signals, e.g., a recording device. The audio device (110) may be equipped with a microphone (112) to pick up speech (speech signal (192)). The microphone may also pick up a noise signal (196).

The speech signal (182) may originate from the local participant (190). For a headset, the local participant may be the wearer of the headset. For other types of audio devices, e.g., a conference system, the local participant may include one or more speakers in a conference room. The noise signal (196) may originate from one or more noise sources (194) and may include noise. The noise of different noise sources (194) may have different characteristics. For example, the noise sources (194) may include stationary noise sources and nonstationary noise sources. A stationary noise source may be any noise source that produces a stationary noise (e.g., a continuous hissing, humming, buzzing) as the stationary noise may be produced by heating and/or cooling systems, electronic devices, or other continuous noise source.

A nonstationary noise source may be any noise source that produces a nonstationary noise such as a clapping, hammering, knocking, or other discontinuous noise. Nonstationary noise may be environmental noise or may originate from a person, for example, when typing, flipping pages of a document, closing a door, dropping an object, etc. In one or more embodiments, the noise signal may be originating from any type of noise source (e.g., human, mechanical, electronic, etc. or any combination thereof). The noise signal (196) and the speech signal (192) may temporally overlap, such that the noise signal (196) becomes a background noise superimposed on the speech signal. The microphone (112) may, thus, indiscriminately pick up both the speech signal (192) and the noise signal (196) to form the noisy audio input signal (197).

The noisy audio input signal (197) may be analog-to-digital converted by the analog-to-digital (A/D) converter (114). Subsequently, the transmit audio processing (116) may operate on the A/D-converted noisy audio input signal (197). In one or more embodiments, the transmit audio processing (116) may include operations described below in reference to the flowcharts of FIGS. 5 and 6. Broadly speaking, the transmit audio processing may include noise cancellation operations and other audio processing operations resulting in a comprehensively processed audio signal and a partially processed audio signal, as discussed below in reference to FIGS. 3, 5, and 6.

The output of the transmit audio processing (116) may be provided to the host device (170) via an interface, for example a USB, Bluetooth, Ethernet or WLAN interface, or any other communication interface. The interface may be bidirectional, thus also providing audio from the host device to the audio device.

The receive audio processing (120) may operate on an audio signal received from the host device (170) and may include operations such as a gain control, a limiter, an equalizer, one or more types of noise filtering, etc. The output of the receive audio processing (120) may be provided to a speaker (126) via a digital-to-analog (D/A) converter (124) and a mixer (122), thus providing an audio return path from the remote participant (198) to the local participant (190). In one or more embodiments, the mixer (122) combines the signal from the receive audio processing (120) with a signal obtained from a sidetone equalizer (118). The sidetone equalizer (118) directly feeds the noisy audio input signal (197) back to the speaker, to provide the local participant (190) with auditory feedback. The noisy audio input signal may be attenuated, depending on the configuration of the sidetone equalizer (118).

Figure 6:
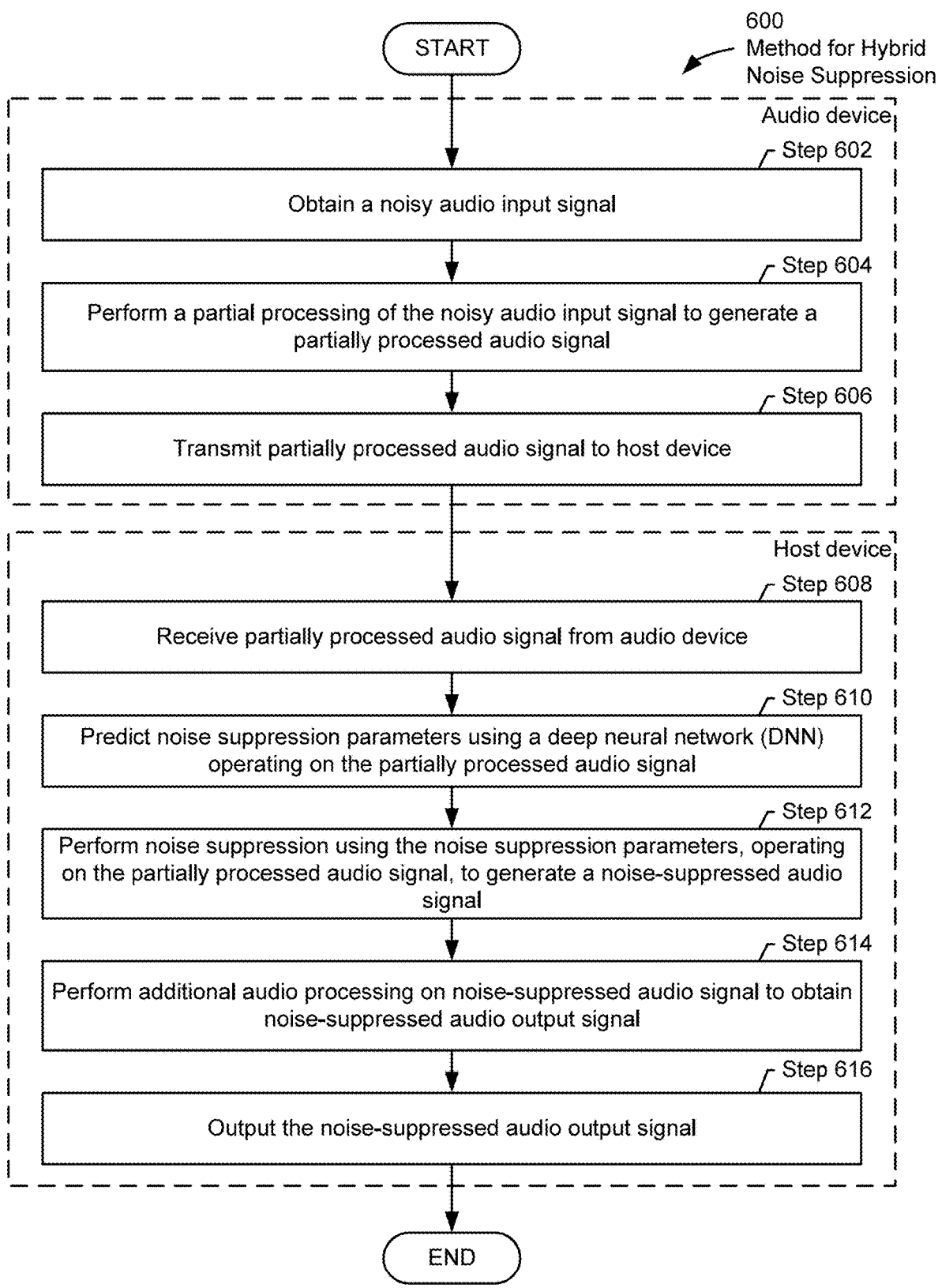
FIG. 6 shows a flowchart describing a method for hybrid noise suppression, in accordance with one or more embodiments of the disclosure.
Figure 7A:
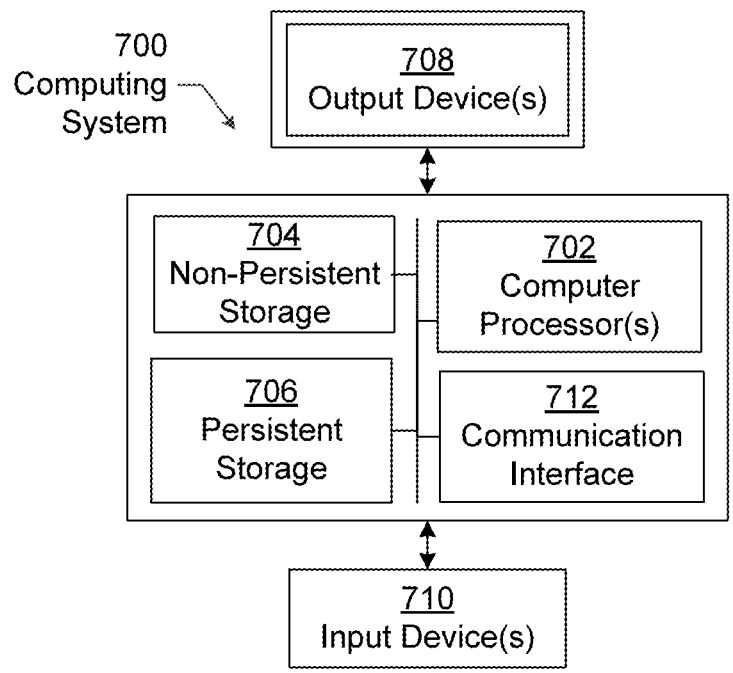
FIGS. 7A and 7B show computing systems, in accordance with one or more embodiments.
Figure 7B:
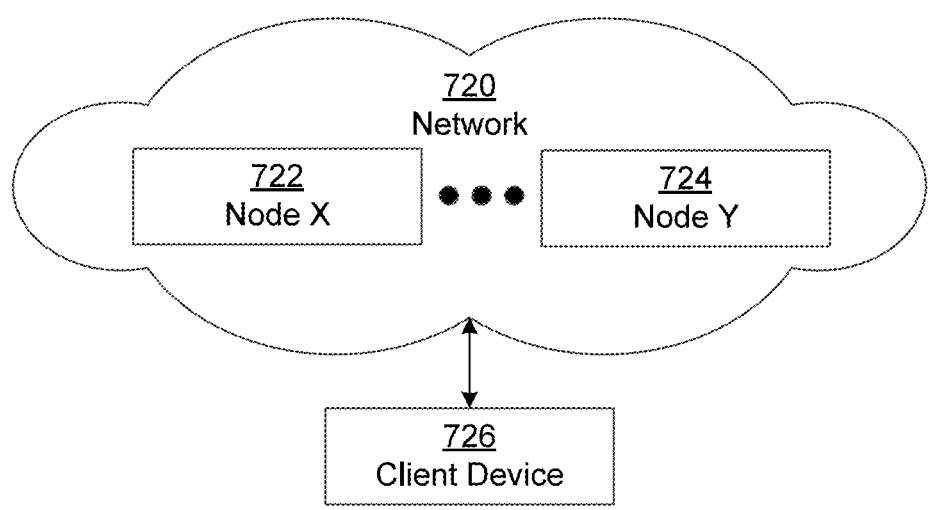

Turning to the host device (170), the host device (170) may be any type of computing device, e.g. a computing system as shown in FIGS. 7A and 7B. The host device may be a laptop, a smartphone, a tablet, etc. In one or more embodiments, the host device executes a software application configured to operate in conjunction with the audio device (110). The software application may execute operations as described below in reference to FIGS. 5, and 6. Broadly speaking, the software application on the host device (170) may perform a noise suppression that includes a machine-learning based component, as discussed in detail below. The host device (170) may interface with a digital network (180), e.g., the Internet via any type of network interface, including Ethernet, wireless and/or cellular network interfaces.

Figure 2:
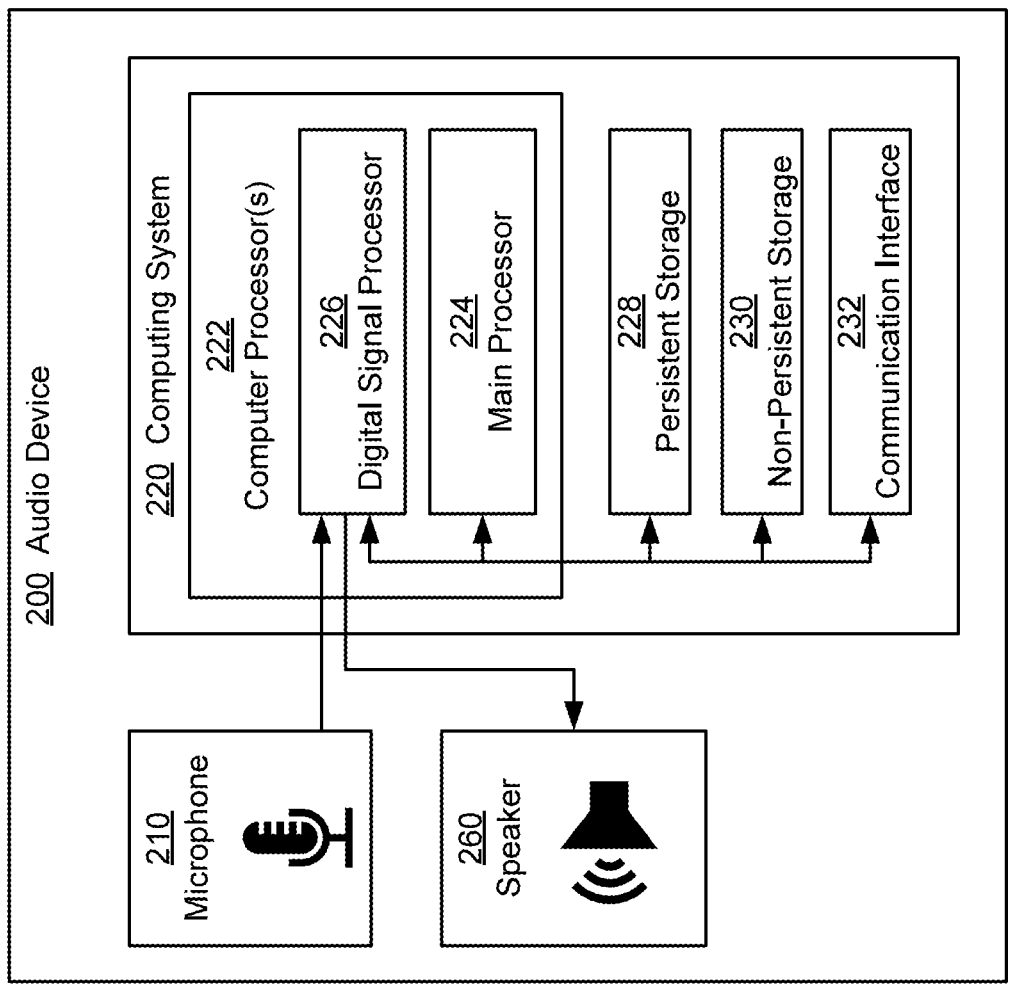
FIG. 2 shows an audio device, in accordance with one or more embodiments of the disclosure.

Turning to FIG. 2, and audio device in accordance with one or more embodiments is shown. The audio device (200) may correspond to the audio device (110) of FIG. 1.

In one or more embodiments, the audio device (200) includes a computing system (220). The computing system (220) may include various components such as one or more computer processors (222), persistent storage (228), non-persistent storage (230), and a communication interface (232).

The one or more computer processors (222) may include one or more integrated circuits for processing instructions. For example, the computer processor(s) (222) may be one or more cores or micro-cores of a processor. The one or more computer processors (222) may include a main processor (224) and/or a digital signal processor (DSP) (226). The DSP (226) and/or the main processor (224) may process audio signals received from the microphone (210), e.g., to perform the hybrid noise suppression on the audio signals by executing one or more of the instructions described below with reference to the flowcharts of FIGS. 5 and 6. In addition, the DSP (226) and/or the main processor (224) may also perform operations to output an audio signal by the speaker (260), e.g., when receiving an audio signal via the communication interface (232). The main processor (224) may further execute an operating system and may be involved in various tasks such as communications with other devices via the communication interface (232).

The persistent storage (228) may be a hard disk, an optical drive such as a compact disk (CD) drive or digital versatile disk (DVD) drive, a flash memory, etc., storing, for example, the operating system, and instructions, e.g., instructions implementing one or more of the steps of the methods described below with reference to the flowcharts of FIGS. 5 and 6.

The non-persistent storage (230) may be volatile memory, such as random-access memory (RAM) and/or cache memory, used when executing the steps of the methods described below.

Figure 3:
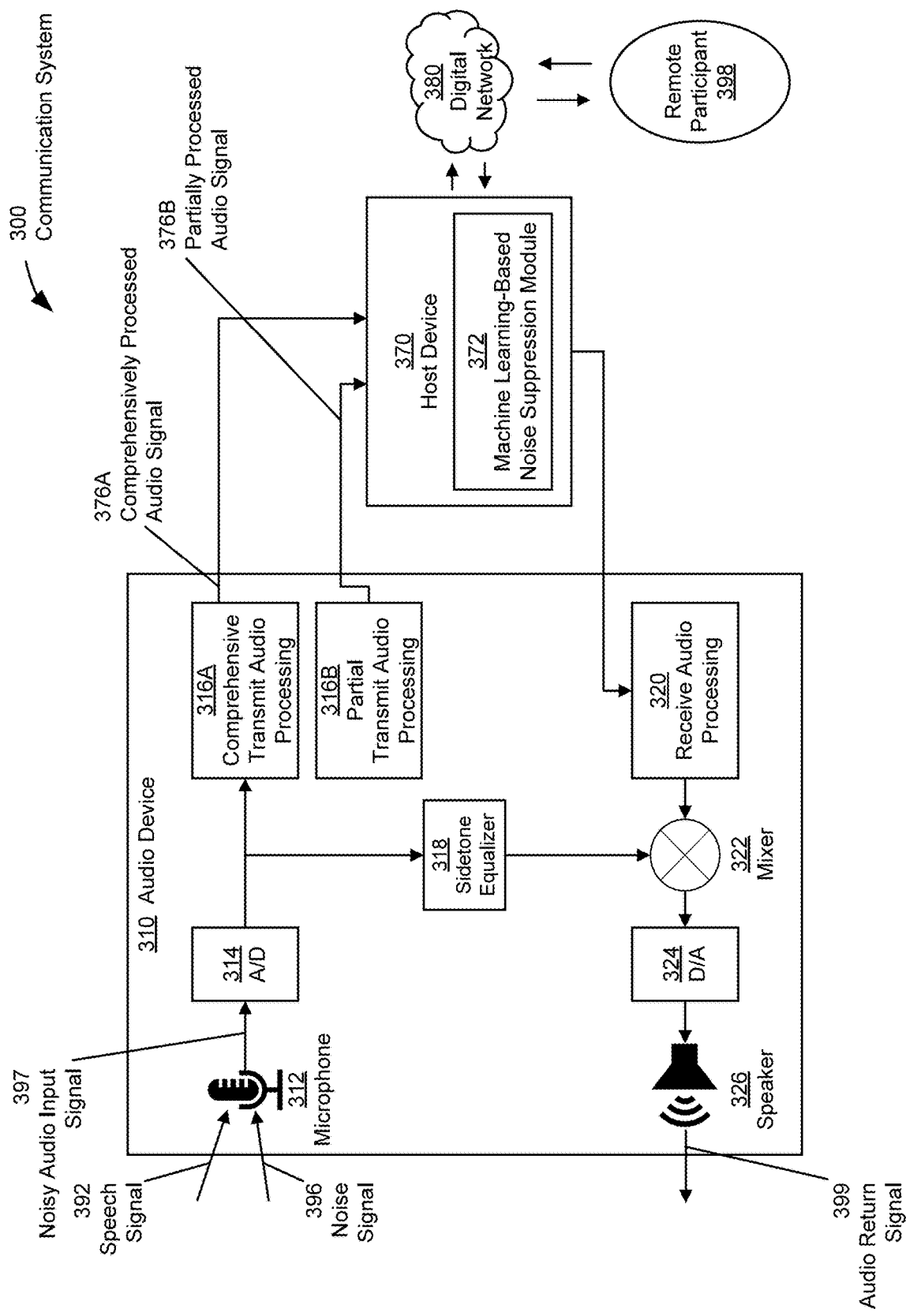
FIG. 3 shows a communication system, in accordance with one or more embodiments of the disclosure.

Turning to FIG. 3, a communication system in accordance with one or more embodiments of the disclosure is shown. The communication system (300) may correspond to the communication system (100), with additional details shown. Specifically, the audio device (310) includes a comprehensive transmit audio processing (316A) and a partial audio transmit processing (316B).

The comprehensive transmit audio processing (316A) operates on the noisy audio input signal (397) after the A/D conversion (314) and outputs a comprehensively processed audio signal (376A). The comprehensive transmit audio processing (316A) may include operations, such as a beamforming operation. The beamforming may be used to isolate the speaker's voice from noise, other speakers' voices, etc. The comprehensive transmit audio processing (316A) may also include an automatic gain control (AGC), an equalizer, an echo cancellation, a noise cancellation (e.g., noise spectrum estimate-based noise suppression, described below in Step 504 of the flowchart of FIG. 5), a limiter, etc. In one or more embodiments, at least some of operations performed as part of the comprehensive transmit audio processing (316A) introduce latencies. The individual latencies may be in the range of a few to tens of milliseconds or more. The individual latencies may be additively combined to result in a total latency associated with the comprehensive transmit audio processing (316A).

The partial transmit audio processing (316B) operates on the noisy audio input signal (397) after the A/D conversion (314) and outputs a partially processed audio signal (376B). In one or more embodiments, the operations performed as part of the partial transmit audio processing (316B) are a subset of the operations performed as part of the comprehensive transmit audio processing (316A). For example, the partial transmit audio processing (316B) may include the echo cancellation, and a limiter, but may exclude the AGC, the equalizer, and/or the noise suppression. In one or more embodiments, operations causing distortions that may interfere with the machine learning-based noise cancellation, described below, are excluded, whereas operations that have no effect or a beneficial effect on the machine learning-based noise cancellation are included.

In one or more embodiments, at least some of operations performed as part of the partial transmit audio processing (316B) introduce latencies. The individual latencies may be in the range of a few to tens of milliseconds or more. The individual latencies may be additively combined to result in a total latency associated with the partial transmit audio processing (316B). In one or more embodiments, the total latency associated with the partial transmit audio processing (316B) is less than the total latency associated with the comprehensive transmit audio processing (316A).

In one or more embodiments, the host device (370) includes a machine learning-based noise suppression module (372). The machine learning-based noise suppression module is described below in reference to FIG. 4.

Other components of the communication system (300) may be similar to the corresponding components of the communication system (100) of FIG. 1.

Figure 4:
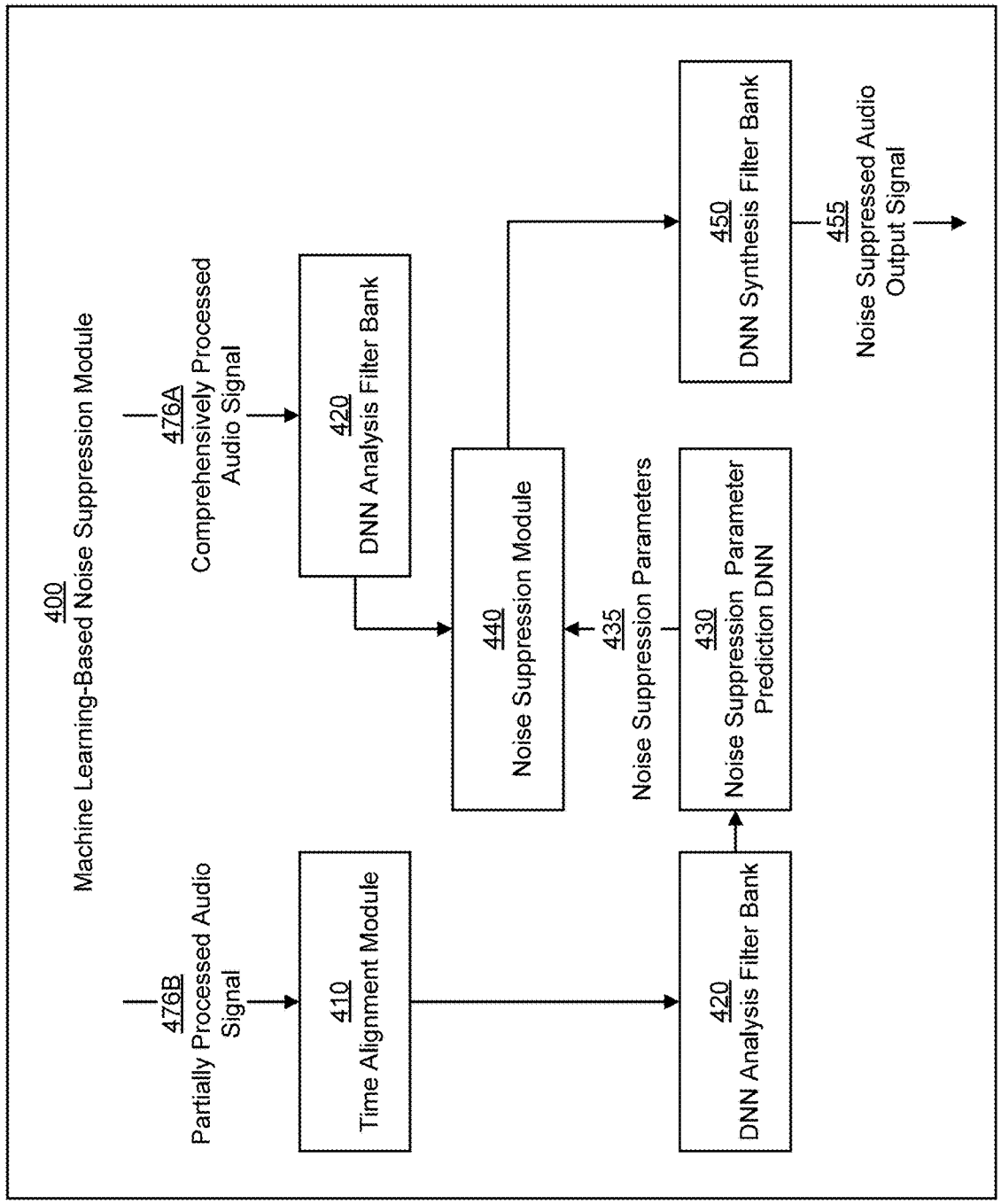
FIG. 4 shows a machine learning noise suppression, in accordance with one or more embodiments of the disclosure.

Turning to FIG. 4, a machine learning-based noise suppression in accordance with one or more embodiments is shown. The machine learning-based noise suppression includes a branch for identifying noise suppression parameters (435), including a time alignment module (410), a discrete neural network analysis filter bank (420), and a noise suppression parameter prediction discrete neural network (DNN) (430). The input to the branch for identifying the noise suppression parameters (435) is the partially processed audio signal (476B). The machine learning-based noise suppression further includes a branch for generating a noise suppressed audio output signal (455), including a DNN analysis filter bank (420), a noise suppression module (440), and a DNN synthesis filter bank (450).

Figure 5:
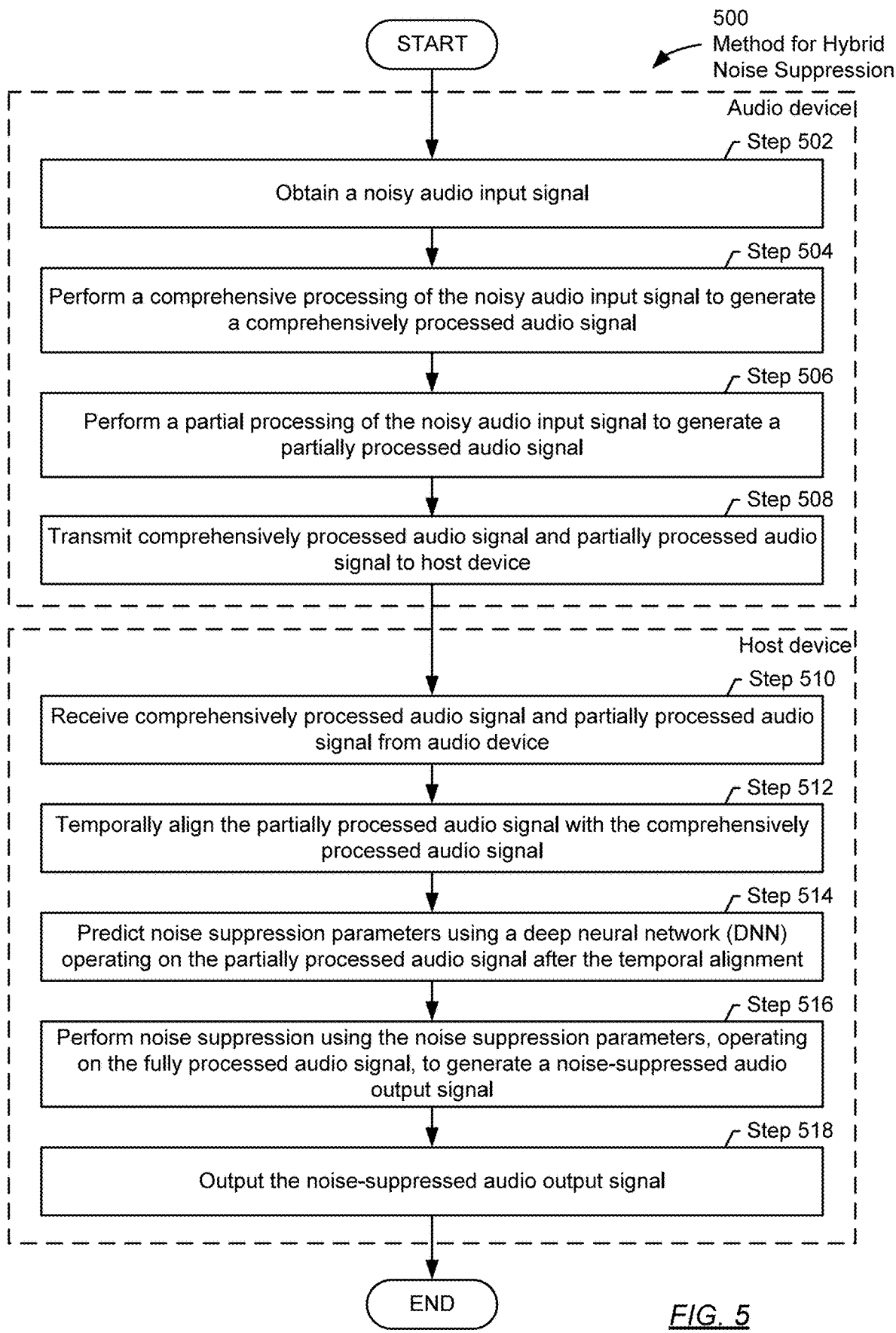
FIG. 5 shows a flowchart describing a method for hybrid noise suppression, in accordance with one or more embodiments of the disclosure.

The time alignment module (410), further described in Step 512 of the flowchart of FIG. 5, in one or more embodiments, delays the partially processed audio signal (476B) to achieve temporal alignment with the comprehensively processed audio signal (476A). The alignment is performed to ensure that the noise suppression parameters (435) obtained for a particular time interval of the partially processed audio signal (476B) (e.g., a 10 msec or 20 msec audio segment) are applied to the same time interval of the comprehensively processed audio signal (476A) when performing the noise suppression by the noise suppression module (440). Without the alignment, the partially processed audio signal (476B) would lead the comprehensively processed audio signal (476A) in time, because more delay-causing operations have been performed on the comprehensively processed audio signal (476A) than on the partially processed audio signal (476B), as previously described in reference to FIG. 3. Namely, because of the different latencies, for the audio located at the same point in time when captured by the microphone, the partially processed audio signal would be transmitted to the filter bank and the next stage of processing prior to the comprehensively processed audio signals proceeding as input. Additional details are provided below in reference to the flowchart of FIG. 5.

The DNN Analysis filter bank (420) transforms the output of the time alignment module (410) from the time domain to the frequency domain, as described in reference to FIG. 5.

The noise suppression parameter prediction DNN (430), in one or more embodiments, is a deep neural network as described below in Step 514 of the flowchart of FIG. 5.

Prior to the noise suppression parameter prediction DNN (430) being used, the neural network model may require training. The training may be based on real or synthetic data, e.g., hours of clean speech and noise data. The training may be performed by executing the neural network model on a mix of clean speech (i.e., speech without noise) and noise, serving as the training input. The outputted noise suppression parameters in the form of sub-band gain values may then be evaluated to assess their performance in terms of attenuating the noise in the mix of clean speech and noise to obtain an estimate of the clean speech. A loss function is applied to differences between the estimate of the clean speech and the corresponding actual clean speech. A gradient descent algorithm may be used to update weights in the neural network model. By way of an example, the gradient decent algorithm may be the Adam (Adaptive Moment Estimation) algorithm. The training is continued until the neural network model are deemed sufficiently trained (e.g., when the neural network model reaches a predictive performance deemed sufficient). The neural network model may be periodically retrained, e.g., to address a new type of noise.

For the noise suppression parameter prediction DNN (430) to perform properly, it is important that the audio signal, on which the noise suppression parameter prediction DNN (430) is operating, has characteristics similar to the training data. Accordingly, the noise suppression parameter prediction DNN (430) operates on the partially processed audio signal (476B), not the comprehensively processed audio signal (476A). The noise suppression parameters (435), described in reference to FIG. 5, are provided to the noise suppression module (440), where the comprehensively processed audio signal (476A) undergoes a noise suppression, as described in Step 516 of the flowchart of FIG. 5. Because the noise suppression module (440) operates in the frequency domain, the DNN analysis filter bank converts the comprehensively processed audio signal (476A) from the time domain to the frequency domain. After the noise suppression by the noise suppression module (440) the result is converted from the frequency domain to the time domain by the DNN synthesis filter bank (450) to output the noise suppressed audio output signal (455).

While FIGS. 1, 2, 3, and 4 show configurations of components, other configurations may be used without departing from the scope of the disclosure. For example, the audio device and/or the host device may include additional hardware and/or software components, not shown in FIGS. 1, 2, 3, and 4. Also, while the noise suppression as shown operates on a signal to be transmitted to a remote participant, a similar noise suppression may be used to process a signal received from the remote participant.

FIG. 5 and FIG. 6 show flowcharts in accordance with one or more embodiments. One or more of the steps in FIGS. 5 and 6 may be performed by various components of the audio device, previously described with reference to FIGS. 1, 2, 3, and 4.

While the various steps in these flowcharts are presented and described sequentially, one of ordinary skill will appreciate that some or all of the steps may be executed in different orders, may be combined or omitted, and some or all of the steps may be executed in parallel. Additional steps may further be performed. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Accordingly, the scope of the disclosure should not be considered limited to the specific arrangement of steps shown in FIGS. 5 and 6.

Turning to the flowchart of FIG. 5, a method (500) for hybrid noise suppression, in accordance with one or more embodiments, is shown. Broadly speaking, the method may process a noisy audio input signal to obtain a noise-suppressed audio output signal. The processing is performed by two complementary noise suppression approaches in combination, as described below. Some of the steps (Steps 502-508) are performed by the audio device, and some of the steps (Steps 510-518) are performed by the host device.

In Step 502, a noisy audio input signal is obtained from an audio source. As previously noted, the noisy audio input signal may include a signal of interest (e.g. speech), and a noise signal. The noise signal may include stationary and/or nonstationary noise. In one embodiment, the noisy audio input signal is obtained by capturing an audio signal using a microphone. Alternatively, the noisy audio input signal may be obtained from elsewhere, e.g., from an audio recording. The obtaining of the noisy audio input signal may further include segmenting the noisy audio input signal. For example, the segmenting may split the noisy audio input signal into segments of a duration of, e.g., 10 msec or 20 msec. Accordingly, the subsequently described operations may be performed on short segments of the noisy audio input signal. By repeating the operations for a set of consecutive short segments, a noisy audio input signal of any duration may be processed.

In Step 504, a comprehensive processing is performed on the noisy audio input signal to generate a comprehensively processed audio signal. The comprehensive processing may involve one or more of a beamforming, an automatic gain control (AGC), an equalizing, an echo cancellation, a limiting, and a noise spectrum estimate-based noise suppression.

In one or more embodiments, in the noise spectrum estimate-based noise suppression, the noisy audio input signal (or noisy speech signal), y, may be expressed as the sum of the clean speech, x, and background noise, s:

$$y_{noisy}[n]=x_{clean}[n]+s_{noise}[n], \quad (1)$$

where n is the discrete time domain sample index, n=0 . . . M−1. For example, M may be between 10 and 20 msec. The frequency domain of the corresponding variables in Equation (1) may be written as:

$$Y[k]=X[k]+S[k] \quad (2)$$

where Y[k], X[k], S[k] is the noisy audio input signal in the frequency domain, clean speech signal in the frequency domain, background noise in the frequency domain, respectively, and k is the discrete frequency domain index, k=0 . . . N−1.

A Fast Fourier Transform (FFT) may be performed to transform the noisy audio input signal from the time domain to the frequency domain. N may be the FFT size that establishes the number of sub-bands in the frequency domain. In one embodiment, a 48 kHz sampling frequency is used to operate in a frequency range of 0-24 kHz, and 960 sub-bands of equal width are generated for the frequency range of 0-24 kHz. Any other frequency range and any other number of sub-bands may be used, without departing from the disclosure.

Once transformed to the frequency domain, a spectral subtraction noise suppression may be defined as finding a set of sub-band scalar gain values such that an estimated clean audio signal may be approximated as:

$$\hat{X}[k] = g[k]Y[k] = \frac{|Y[k]| - |\hat{S}[k]|}{|Y[k]|} Y[k]. \quad (3)$$

$|\hat{S}[k]|$ is the estimated background noise spectral magnitude of the $k^{th}$ sub-band. Thus, the noise-spectrum estimate-based noise suppression approach includes two steps: (1) estimate the background noise spectral magnitude, and (2) compute a set of sub-band gain values {g[k], k=0 . . . N−1} using the ratio as defined in Equation (3). The first step of performing the estimation of the background noise spectral magnitude may be accomplished, for example, by observing the stationary noise energy in sub-bands using long-term measures of minimum energy, e.g., over a time span longer than the 10-20 millisecond (msec) intervals on which an algorithm based on Equation (3) operates. For example, a prolonged time interval of a second, multiple seconds, or longer, may be considered.

An interval, where minimum energy is observed within the prolonged time interval, may be assumed to include background noise but not speech. In the second step, the sub-band gain values may be determined by the ratio of the current energy to that of the estimated noise energy in that sub-band. A high ratio may imply a high gain and a low ratio may imply a low gain. In other words, the computed sub-band gain values may be low for those sub-bands whose content is mostly noise, and high for those sub-bands whose content is mostly speech. By applying the sub-band gain values to the sub-bands, e.g., by multiplying each of the sub-bands with the corresponding sub-band gain values, a re-shaping of the spectrum, in the frequency domain is performed. Essentially, the spectrum is reshaped from "noisy" (including background noise) to "clean" (excluding background noise, while still including speech). A sub-band gain value of "0" may completely attenuate the content in the sub-band, whereas a sub-band gain value of "1" may pass all content in the sub-band without attenuation.

In one or more embodiments, the noise-spectrum estimate-based noise suppression approach is particularly effective at removing stationary background noise. For example, in one scenario, 10 decibels (dB) of stationary background noise (e.g., HVAC, fan, ambience, etc.) were effectively removed.

The noise spectrum estimate-based noise suppression is performed by removing the noise estimate from the noisy audio input signal for the set of frequency sub-bands. The obtained sub-band gain values may be applied to the noisy audio input signal, e.g., by multiplying the noisy audio input signal in each of the frequency sub-bands by the sub-band gain values, to obtain a processed audio signal, for the set of frequency sub-bands.

Subsequently, the obtained comprehensively processed audio signal processed audio signal in the set of frequency sub-bands is transformed from the frequency domain to the time domain. An Inverse Fast Fourier Transform (IFFT) may be used.

In Step 506, a partial processing is performed on the noisy audio input signal to generate a partially processed audio signal. In one or more embodiments, the partial processing excludes one or more of the operations performed by the comprehensive processing. In one or more embodiments, partial processing excludes the noise spectrum estimate-based noise suppression. The partial processing may further exclude the automatic gain control (AGC) and the equalizing. The beamforming, echo cancellation and/or the limiting may be performed, as part of the partial processing. One or more of the operations in Step 506 may be performed in the frequency domain. Accordingly, Step 506, analogous to Step 504, may include a time domain to frequency domain transformation and a frequency domain to time domain transformation.

In Step 508, the comprehensively processed audio signal and the partially processed audio signal are transmitted to the host device, by the audio device. The transmission may be performed using any type of digital interface, e.g., a Bluetooth interface, a USB interface, a Wi-Fi interface, etc.

In Step 510, the comprehensively processed audio signal and the partially processed audio signal are received by the host device, from the audio device.

In Step 512, the partially processed audio signal is temporally aligned with the comprehensively processed audio signal. As previously discussed, each of the operations performed in conjunction with the comprehensive transmit audio processing and each of the operations performed in conjunction with the partial transmit audio processing may introduce a delay. Because the partial transmit audio processing includes a subset of the operations of the comprehensive transmit audio processing, more delay is introduced by the comprehensive transmit audio processing in comparison to the partial transmit audio processing. The operations of Step 512 impose an additional delay on the partially processed audio signal to obtain temporal alignment with the comprehensively processed audio signal.

In Step 514, noise suppression parameters are predicted using a deep neural network (DNN) or any other type of neural network model. The noisy speech signal may be rewritten to include impulsive noise, $s_{impulsive}$, and ambience (background) noise, $s_{ambience}$, as:

$$y_{noisy}[n]=x_{clean}[n]+s_{ambience}[n]+s_{impulsive}[n] \quad (4)$$

In the machine learning-based noise suppression, a neural network model (e.g., a deep neural network model) may be used to predict noise suppressing sub-band gain values. As further discussed below, a neutral network model may be particularly effective at suppressing the impulsive noise, $s_{impulsive}$. Analogous to the noise spectrum estimate-based noise suppression, the machine learning-based noise suppression is based on a set of sub-bands in the frequency domain. In one embodiment, a 48 kHz sampling frequency is used to operate in a frequency range of 0-24 kHz, and 480 sub-bands of equal width are generated for the frequency range of 0-24 kHz. Any other frequency range and any other number of sub-bands may be used, without departing from the disclosure.

In Step 514, first, the partially processed audio signal is transformed from the time domain to the frequency domain, in a set of frequency sub-bands. As previously described, the transformation may be performed using a Fast Fourier Transform (FFT) e.g., in a frequency range of 0-24 kHz, with 480 frequency sub-bands of equal width.

In Step 514, next, a feature vector is generated to form the input to the neural network model. The feature vector may consist of values of the sub-bands in the frequency domain, and/or other values derived from the sub-bands in the frequency domain. For example, particular sub-bands may be selected to mimic the psychoacoustic domain of human hearing.

Next, based on the feature vector, the neural network model may predict a sub-band gain value for each of the sub-bands. The predicted sub-band gain values may be low for those sub-bands whose content is mostly noise, and high for those sub-bands whose content is mostly speech. A sub-band gain value of "0" may completely attenuate the content in the sub-band, whereas a sub-band gain value of "1" may pass all content in the sub-band without attenuation. The sub-band gain values are the "predicted" output of a highly non-linear mapping of the neural network model. Thus, in case of the machine learning-based noise suppression approach, the estimated clean speech may be expressed as:

$$X[k]=g[k]Y[k]=DNN(k,f[u_0,u_1,\ldots,u_p])Y[k], \quad (5)$$

where $f[u_1, u_2, \ldots, u\_p]$ is the feature vector extracted based on the noisy speech spectrum $Y[k]$.

The sub-band gain values, $g[k]$, produced by the neural network model, DNN, in an additional step may further be tuned to increase or reduce an attenuation. For example, sub-band gain values associated with individual sub-bands may be smoothed over time when fluctuating within a certain range, between consecutive executions of an algorithm based on Equation (5). The smoothing may be performed using a filter such as an infinite impulse response (IIR) filter. The smoothing may be skipped when a sub-band gain value changes beyond a specified limit (e.g., a sudden change from a relatively high gain to a much lower gain may be desirable to attenuate a nonstationary noise such as a tap event).

In one embodiment, the neural network model, DNN, by which the sub-band gain values are determined based on the feature vector is a deep neural network and may include, for example, three dense layers and three recurrent layers. The deep neural network may include gated recurrent units. Any other type of neural network model, such a convolutional neural network or a long short term memory may be used without departing from the disclosure.

In one or more embodiments, the machine learning-based noise suppression approach is particularly effective at removing nonstationary background noise (like keyboard typing, paper rustling, crowd noise), based on the highly non-linear mapping of the neural network model. Accordingly, with the noise-spectrum estimate-based noise suppression approach providing superior suppression of stationary noise, and the machine learning-based noise suppression approach providing superior suppression of nonstationary noise, in one or more embodiments, the two approaches are combined to provide superior noise suppression of both stationary noise, $s_{ambience}[n]$, and non-stationary noise, $s_{impulsive}[n]$, in Equation (4), in a complementary manner.

In Step 516, a noise suppression is performed using the noise suppression parameters. In one or more embodiments, the noise suppression operates on the comprehensively processed audio signal to generate a noise-suppressed audio output signal.

In Step 516, first, the comprehensively processed audio signal is transformed from the time domain to the frequency domain, in a set of frequency sub-bands. As previously described, the transformation may be performed using a Fast Fourier Transform (FFT) e.g., in a frequency range of 0-24 kHz, with 480 frequency sub-bands of equal width.

In Step 516, next, the noise-suppressed audio output signal is obtained by scaling the comprehensively processed audio signal in the set of frequency sub-bands according to the sub-band gain values obtained in Step 514. Because, in Step 512, a temporal alignment of the partially processed audio signal with the comprehensively processed audio signal was performed, the sub-band gain values, obtained in Step 514, are properly aligned with the comprehensively processed audio signal, when performing the scaling, in Step 516, to accomplish an optimum noise suppression.

In Step 516, subsequently, the noise-suppressed audio output signal in the set of frequency sub-bands is transformed from the frequency domain to the time domain. An Inverse Fast Fourier Transform (IFFT) may be used to perform Step 516.

In Step 518, the noise-suppressed audio output signal is outputted. The nature of the output operation in Step 518 depends on the type of the communication system performing the method of FIG. 5. In case of a teleconferencing system or headset system, the teleconferencing or headset system may send the noise-suppressed audio output signal to a remote participant. In case of an audio recording device, the noise-suppressed audio output signal may be stored to a non-volatile memory.

While not shown in the flowchart of FIG. 5, a training of the neural network model may be performed at some point in time, prior to the execution of Step 514. Broadly speaking, the training may be performed as described in reference to FIG. 4.

Turning to the flowchart of FIG. 6, a method (600) for hybrid noise suppression, in accordance with one or more embodiments, is shown. Broadly speaking, the method may process a noisy audio input signal to obtain a noise-suppressed audio output signal. The processing is performed by two complementary noise suppression approaches in combination, as described below. some of the steps (Steps 602-606) are performed by the audio device, and some of the steps (Steps 608-616) are performed by the host device. Unlike the method described in FIG. 5, where both a partially processed audio signal and a comprehensively processed audio signal are transmitted from the audio device to the host device, the method of FIG. 6 does not require the transmission of the comprehensively processed audio signal.

In Step 602, a noisy audio input signal is obtained from an audio source. Step 602 may be similar to Step 502 of the flowchart of FIG. 5.

In Step 604, a partial processing is performed on the noisy audio input signal to generate a partially processed audio signal. Step 604 may be similar to Step 506 of the flowchart of FIG. 5.

In Step 606, the partially processed audio signal is transmitted to the host device, by the audio device. The transmission may be performed using any type of digital interface, e.g., a Bluetooth interface, a USB interface, a Wi-Fi interface, etc.

In Step 608, the partially processed audio signal is received by the host device, from the audio device.

In Step 610, noise suppression parameters are predicted using a deep neural network (DNN) or any other type of neural network model. While the operations performed in Step 514 may be similar or identical to the operations in Step 514 of the flowchart of FIG. 5, Step 610 is applied to the partially processed audio signal without performing a temporal alignment, whereas a temporal alignment is performed prior to Step 514.

In Step 612, a noise suppression is performed using the noise suppression parameters. In one or more embodiments, the noise suppression operates on the partially processed audio signal to generate a noise-suppressed audio output signal.

In Step 612, first, the partially processed audio signal is transformed from the time domain to the frequency domain, in a set of frequency sub-bands. As previously described, the transformation may be performed using a Fast Fourier Transform (FFT) e.g., in a frequency range of 0-24 kHz, with 480 frequency sub-bands of equal width. The transformation from time domain to frequency domain may be the transformation performed in Step 610.

In Step 612, next, the noise-suppressed audio signal is obtained by scaling the partially processed audio signal in the set of frequency sub-bands according to the sub-band gain values obtained in Step 610.

In Step 612, subsequently, the noise-suppressed audio signal in the set of frequency sub-bands is transformed from the frequency domain to the time domain. An Inverse Fast Fourier Transform (IFFT) may be used. Alternatively, if subsequent steps require the noise-suppressed audio signal in the frequency domain, the frequency domain to time domain transformation may not be performed in Step 612.

In Step 614, an additional audio processing may be performed on the noise-suppressed audio signal to obtain a noise-suppressed audio output signal. The additional audio processing may include one or more of an equalizing, an automatic gain control, and a noise spectrum estimate-based noise suppression, as previously described in Step 504 of the flowchart of FIG. 5.

In Step 614, subsequently, the noise-suppressed audio output signal in the set of frequency sub-bands is transformed from the frequency domain to the time domain. An Inverse Fast Fourier Transform (IFFT) may be used.

In Step 616, the noise-suppressed audio output signal is outputted. Step 616 may be similar to Step 518 of the flowchart of FIG. 5.

While not shown in the flowchart of FIG. 6, a training of the neural network model may be performed at some point in time, prior to the execution of Step 610. Broadly speaking, the training may be performed as described in reference to FIG. 4.

Embodiments of the disclosure may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the disclosure may be implemented on a node of a distributed system that is connected to other nodes. By way of another example, embodiments of the disclosure may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the disclosure.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A–B), and the status flags may be read to determine if the result is positive (i.e., if A>B, then A–B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above descriptions of functions present only a few examples of functions performed by the computing system of FIG. 7A and the nodes and/or client device in FIG. 7B. Other functions may be performed using one or more embodiments of the disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for hybrid noise suppression, comprising:
receiving a processed audio signal from an audio device, wherein the processed audio signal results from a partial audio processing performed on a noisy audio input signal;
predicting a noise suppression parameter using a neural network model operating on the processed audio signal;

generating a noise-suppressed audio signal from the processed audio signal, using the noise suppression parameter;

generating a noise-suppressed audio output signal from the noise-suppressed audio signal using an additional audio processing, wherein the additional audio processing comprises a noise spectrum estimate-based noise suppression; and outputting the noise-suppressed audio output signal.

2. The method of claim 1, wherein predicting the noise suppression parameter comprises:

transforming the processed audio signal from a time domain into a frequency domain in a plurality of frequency sub-bands, generating a feature vector from the processed audio signal in the plurality of frequency sub-bands, and obtaining a set of sub-band gain values by applying the neural network model to the feature vector, wherein the set of sub-band gain values forms the noise suppression parameter.

3. The method of claim 1, wherein generating the noise-suppressed audio signal comprises:

transforming the processed audio signal from a time domain into a frequency domain in a plurality of frequency sub-bands, and scaling, according to sub-band gain values provided as the noise suppression parameter, the processed audio signal in the plurality of frequency sub-bands to generate the noise-suppressed audio signal.

4. The method of claim 3, wherein generating the noise-suppressed audio signal further comprises:

transforming the noise-suppressed audio signal from the frequency domain to the time domain.

5. The method of claim 1, wherein the neural network model is a deep neural network.

6. The method of claim 5, wherein the deep neural network comprises gated recurrent units.

7. The method of claim 1, wherein the noise spectrum estimate-based noise suppression comprises:

transforming the noise-suppressed audio signal from a time domain into a frequency domain comprising a plurality of frequency sub-bands, obtaining a noise estimate in the plurality of frequency sub-bands, obtaining the noise-suppressed audio output signal by removing the noise estimate from the noise-suppressed audio signal for the plurality of frequency sub-bands, and transforming, after obtaining the noise-suppressed audio output signal, the noise-suppressed audio output signal from the frequency domain to the time domain.

8. The method of claim 1, wherein the additional audio processing further comprises an automatic gain control.

9. The method of claim 1, wherein the additional audio processing further comprises an equalizing.

10. The method of claim 1, wherein the noise-suppressed audio output signal is in a set of frequency sub-bands, and wherein the noise-suppressed audio output signal is transformed from a frequency domain to a time domain prior to outputting.

11. The method of claim 1, wherein the partial audio processing comprises at least one selected from the group consisting of a beamforming, an automatic gain control, an equalizing, an echo cancellation, and a limiting.

12. A system for hybrid noise suppression, comprising a host comprising:

a memory; and circuitry for performing operations using the memory, the operations comprising:

receiving a processed audio signal from an audio device, wherein the processed audio signal results from a partial audio processing performed on a noisy audio input signal;

predicting a noise suppression parameter using a neural network model operating on the processed audio signal;

generating a noise-suppressed audio signal from the processed audio signal, using the noise suppression parameter;

generating a noise-suppressed audio output signal from the noise-suppressed audio signal using an additional audio processing, wherein the additional audio processing comprises a noise spectrum estimate-based noise suppression; and outputting the noise-suppressed audio output signal.

13. The system of claim 12, wherein predicting the noise suppression parameter comprises:

transforming the processed audio signal from a time domain into a frequency domain in a plurality of frequency sub-bands, generating a feature vector from the processed audio signal in the plurality of frequency sub-bands, and obtaining a set of sub-band gain values by applying the neural network model to the feature vector, wherein the set of sub-band gain values forms the noise suppression parameter.

14. The system of claim 12, wherein generating the noise-suppressed audio signal comprises:

transforming the processed audio signal from a time domain into a frequency domain in a plurality of frequency sub-bands, and scaling, according to sub-band gain values provided as the noise suppression parameter, the processed audio signal in the plurality of frequency sub-bands to generate the noise-suppressed audio signal.

15. The system of claim 14, wherein generating the noise-suppressed audio signal further comprises:

transforming the noise-suppressed audio signal from the frequency domain to the time domain.

16. The system of claim 12, wherein the neural network model is a deep neural network.

17. The system of claim 12, wherein the noise spectrum estimate-based noise suppression comprises:

transforming the noise-suppressed audio signal from a time domain into a frequency domain comprising a plurality of frequency sub-bands, obtaining a noise estimate in the plurality of frequency sub-bands, obtaining the noise-suppressed audio output signal by removing the noise estimate from the noise-suppressed audio signal for the plurality of frequency sub-bands, and transforming, after obtaining the noise-suppressed audio output signal, the noise-suppressed audio output signal from the frequency domain to the time domain.

18. A system for hybrid noise suppression, comprising:

an audio device for performing operations comprising:

performing partial audio processing on a noisy audio input signal, and outputting the processed audio signal results; and a host for performing operations comprising:

receiving the processed audio signal from the audio device, predicting a noise suppression parameter using a neural network model operating on the processed audio signal, generating a noise-suppressed audio signal from the processed audio signal, using the noise suppression parameter, generating a noise-suppressed audio output signal from the noise-suppressed audio signal using an additional audio processing, wherein the additional audio processing comprises a noise spectrum estimate-based noise suppression, and outputting the noise-suppressed audio output signal.

\* \* \* \* \*